(12) United States Patent
Scott

(10) Patent No.: US 6,263,293 B1
(45) Date of Patent: Jul. 17, 2001

(54) EARTHQUAKE SIMULATING SHAKING SYSTEM

(75) Inventor: Ronald F. Scott, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/103,497

(22) Filed: Jun. 24, 1998

Related U.S. Application Data
(60) Provisional application No. 60/051,071, filed on Jun. 27, 1997.

(51) Int. Cl.[7] .......................... G01M 10/00; G01L 25/00; G01B 5/00
(52) U.S. Cl. ................................ 702/113; 702/33; 73/662
(58) Field of Search .................... 702/14, 15, 18, 702/33, 34, 41–44, 113, 116, 141; 73/662, 665

(56) References Cited

U.S. PATENT DOCUMENTS

| | | | |
|---|---|---|---|
| 4,181,029 | * | 1/1980 | Talbott, Jr. ............................. 73/665 |
| 4,602,555 | * | 7/1986 | Bushey .................................... 92/61 |
| 5,009,412 | * | 4/1991 | Roodenburg et al. ................. 472/59 |
| 5,737,239 | * | 4/1998 | Horiuchi et al. ...................... 702/56 |
| 5,969,256 | * | 10/1999 | Hobbs .................................. 73/663 |

* cited by examiner

*Primary Examiner*—Kamini Shah
*Assistant Examiner*—Manuel L. Barbee
(74) *Attorney, Agent, or Firm*—Fish & Richardson PC

(57) ABSTRACT

Earthquake simulating system using separated shake units. The structure to be tested is placed on the shake units. Each of the seperated shake units is separately controlled, relative to another one of them, to produce a new effect. The shake units are movable to accomodate different shapes and types of structures to be simulated.

15 Claims, 4 Drawing Sheets

EARTHQUAKE SIMULATING SHAKING SYSTEM

CROSS REFERENCE TO RELATED APPLICATIONS

This application claims the benefit of U.S. Provisional Application No. 60/051,071 filed on Jun. 27, 1997, which is incorporated herein by reference.

BACKGROUND OF THE INVENTION

The study of damage to buildings during earthquakes has resulted in buildings which can better withstand damage from an earthquake. Each time an earthquake occurs, such a Loma Prieta in 1989, Northridge in 1994, Koba in 1995 and others, the damage is assessed. The cause of that damage is postulated, and ways to avoid that damage in the future may be also determined. Building codes can be modified to reflect new understandings of the mechanisms of failure.

For example, the recent earthquakes have caused concrete highway overpasses to fail. The Northridge earthquake caused cracking of steel columns in high rise buildings. Loma Prieta and Koba caused liquefaction of soil which itself caused damage. All of these damage mechanisms can be reflected in new building designs and can be used to try to mitigate the damage.

It is simply not acceptable to wait until the next earthquake to get more conceivably life saving information. Hence, the science of earthquake simulation has evolved. This includes the use of computer code to model structures and simulate the response to certain input motions. The large number of different possibilities, however, has made it difficult to model this satisfactorily.

A more real-time system forms a physical model of a structure or a portion of a structure. That structure is built on a shaking table. The shaking table is moved to simulate the earthquake ground motion. The system described in the preferred embodiment defines a new kind of structure shaking system which addresses certain drawbacks and limitations in the current system.

Current shaking tables range in size, with a large table being fifty feet or more. A large machine can be used for testing a small full size building, or a full scale component such as joint. All of the machines have in common a rigid table supported by a very large electro-hydraulic cylinder. The hydraulic cylinder is driven by a computer system to form the motion simulating an earthquake. The dynamic forces move the table as a whole, using thousands of tons of force as necessary to simulate the earthquake.

The nature of the ground motion in an earthquake can complicate this system. The ground moves more or less randomly in the horizontal plane, the x and y directions, as well as in the plane orthogonal to the horizontal plane, the z direction. Rotational movements are also developed in each of the x, y and z directions. This results in a total of six degrees of freedom.

Different simulating systems allow different numbers of degrees of freedom. Each additional degree of freedom greatly increases the complexity of construction and hence the cost. Moreover, each actuator system must inevitably react against the stationary object. This often provides forming large and heavy reaction masses in the nearby ground to prevent the vibration from being transmitted to nearby buildings.

SUMMARY

The system described in the preferred embodiment teaches a new design for a shaking system. This shaking system uses a number of separated shaking units are used to form a single large apparatus. Each shaking unit preferably includes three degrees of freedom. Each shaking unit is placed under a place of support of a structure to be tested. For a building structure, for example, the base of each column of the building is supported on a shaking unit. That shaking unit then moves the column base dynamically and laterally in multiple component directions.

The system as disclosed includes a number of advantages that are not taught or suggested by the prior art. Specifically, a prior art shake table uses a rigid system which vibrates all of the footings using the same amount of input motion. In contrast, the system of the preferred embodiment allows separately changing the components of motion on each column base. This allows each unit to have only three degrees of freedom. However, since all the units can be moved separately, more complicated motions, each of which could be considered as a separate degree of freedom, are possible.

For example, the vertical component of motion on each column base could be applied slightly out of phase in order to impart rocking motion about different axes. This provides more ability to simulate complicated motions, such as would occur during an earthquake. The inventor believes this to represent a better and more accurate response of the earth, since the earth's crust will not, in general, move like a flat rocking table.

BRIEF DESCRIPTION OF THE DRAWINGS

These and other aspects of the invention will be described herein with respect to the accompanying drawings, wherein.

DESCRIPTION OF THE PREFERRED EMBODIMENTS

Figure 1:
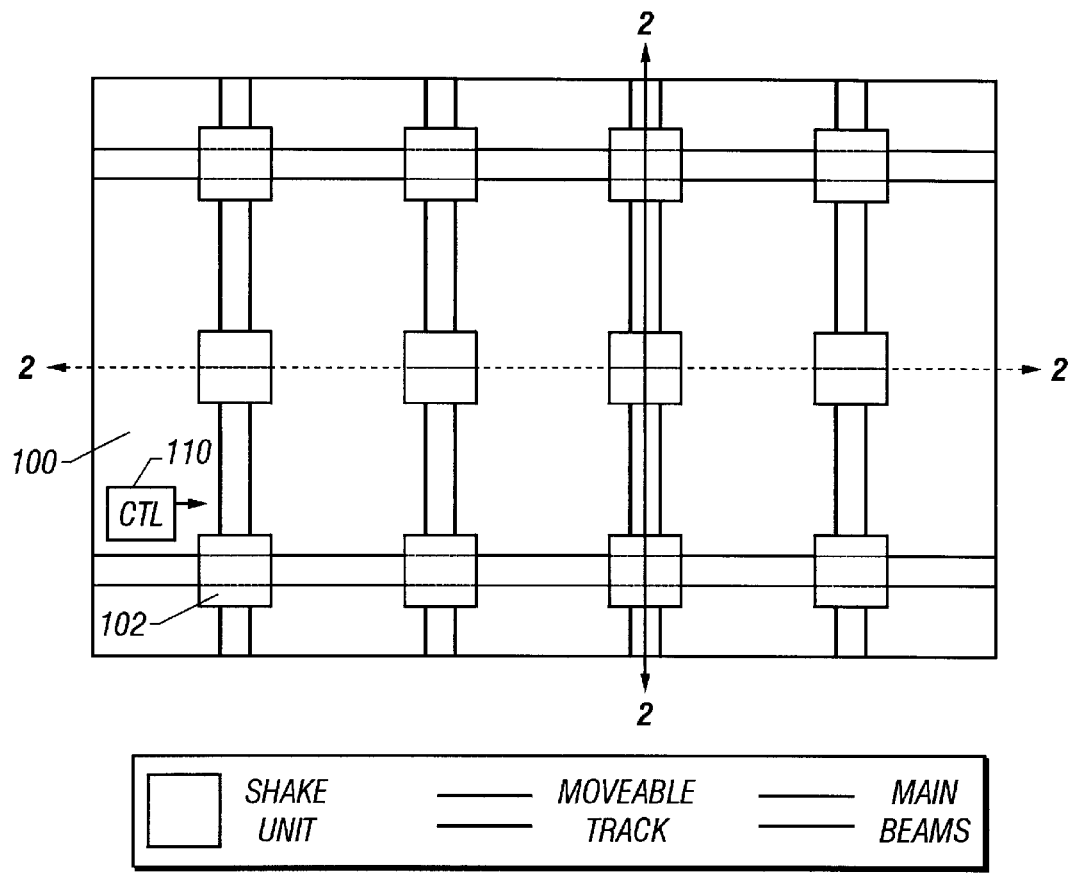
FIG. 1 shows an overall view of the modular shake table of the preferred embodiment.
Figure 2:
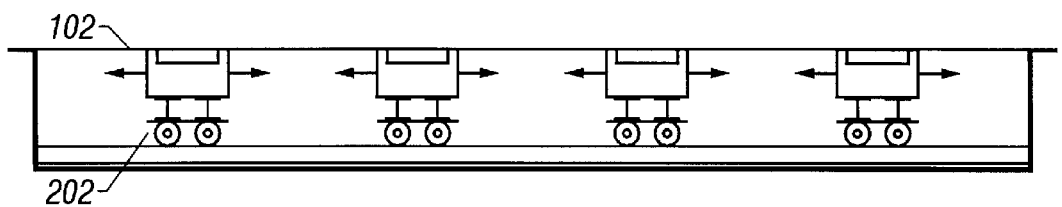
FIG. 2 shows a detail of how the shake units are movable.

A preferred embodiment is shown in FIG. 1. The special shake table assembly 100 is actually formed of a plurality of separated movement producing devices, here, shake units 102. FIG. 2 shows a cross section along the line 2—2 in FIG. 1. Each shake unit 102 is mounted on a wheeled assembly 202 allowing the unit to move to a desired location. Hence, each shake unit 102 is movable. Each shake unit can also be clamped in the desired location as described herein.

Each shake unit enables any desired x, y or z motion, effectively simulating any desired change of the response of the soil under the footing of each column.

The entire system is under the control of controller element 110, which enables control of all of the shake units in synchronism with one another. The preferred system uses a central controller, but it should be understood that the control can be distributed so long as it is synchronized.

Since the shake units are movable, this system can permit any desired different column spacings or unusual structural arrangements to be accommodated. Long structures can be tested by separating the different different shaking units and possibly skipping intermediate units. Moreover, the system as shown herein with separated shaking units enables simulating a traveling earthquake wave by-phase varying the movements of the different shake units relative to one another.

Figure 3:
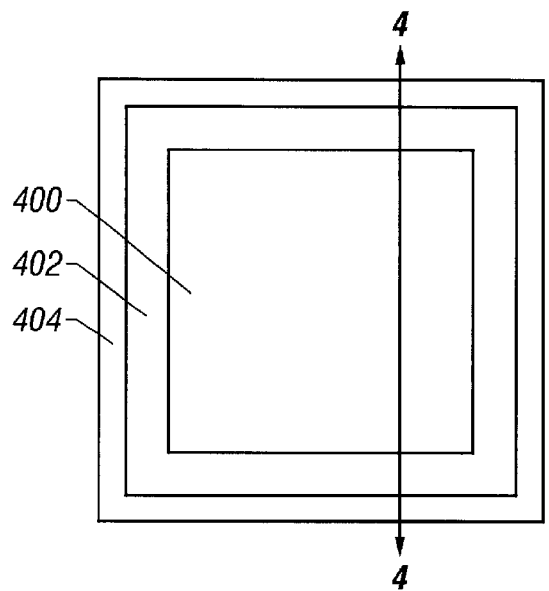
FIG. 3 shows a top view of each shake unit.
Figure 4:
FIG. 4 shows a cross sectional view of the shake unit.
Figure 4:
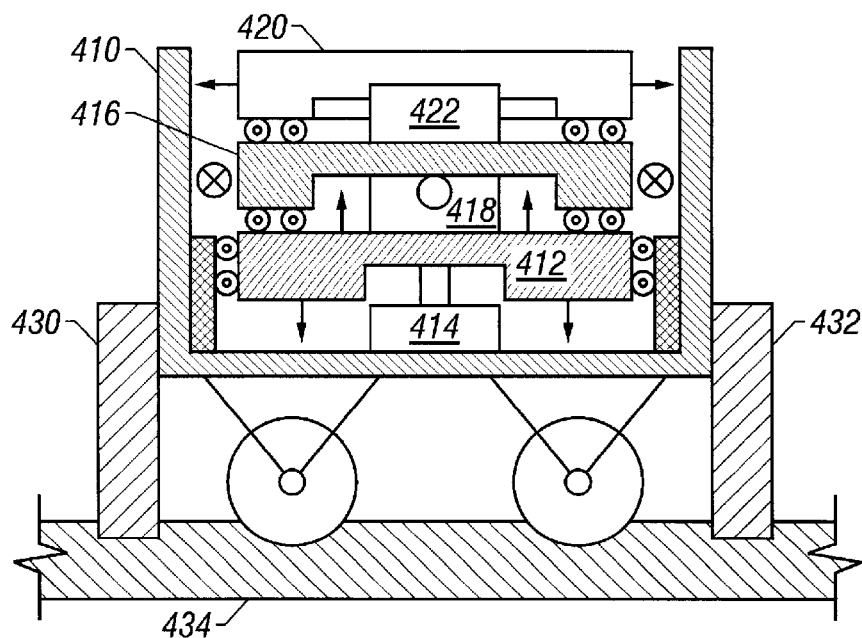

The specific structure of each of the shaking units is shown in FIGS. 3 and 4, where FIG. 4 is a cross section along the line 4—4 in FIG. 3. From the top, each shaking unit includes multiple shaking systems: including the first shaking part 400, the second shaking part 402 and the third shaking part 404. The shaking unit itself is held within a box 410. That box 410 contains three separate actuators which each react and simulate a different kind of motion. A first z axis actuator 414 enables up and down motion which moves the z-axis table 412. A second y actuator table part 418 commands movement in the "y" direction, as shown in FIG. 4, movement being perpendicular to the plane of the paper. This movement is transmitted to the table part 416. A third, x actuator part 422 is shown as being moved in the x direction, left to right in the plane of the paper. This moves the corresponding table 420.

The elements 430 and 432 represent clamps which are clamped down to hold the movable system in place, by clamping to the immovable support 434.

Figure 5:
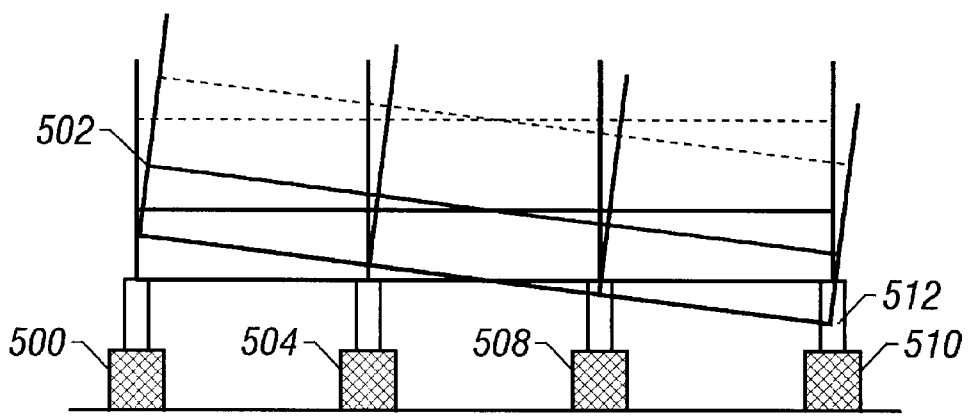
FIG. 5 shows rocking vertical actuators.

By separating the different parts of the shaking unit, additional movement operations, and hence the capability of providing additional degrees of freedom, are provided. For example, appropriate rocking of the vertical actuators one after another yields the operation shown in FIG. 5. The vertical actuators are synchronized to produce the rocking effect. For example, actuator 500 may be raised to the position 502 at the same time as actuator 510 is lowered to the position 512. The intermediate actuators 504 and 508 are similarly controlled to similar intermediate positions. This has the effect of tilting the structure that is located on the overall devices. The position of tilt is changed by controlling the actuators to other intermediate positions. The continuously-changing tilt can simulate different kinds of complex motions.

Rotation is then possible by similarly controlling the three dimensional array of actuators to allow vertical rocking.

Figure 6:
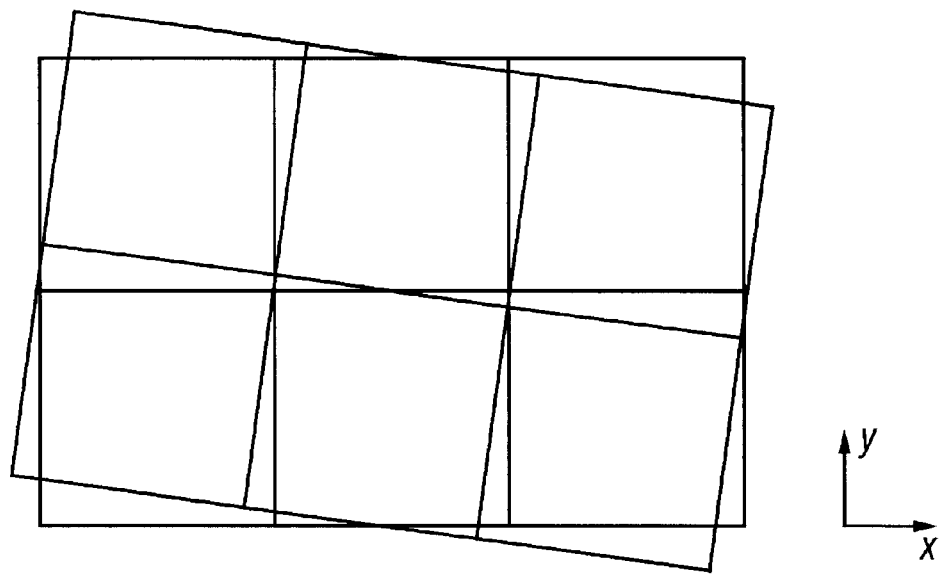
FIG. 6 shows torsioning horizontal actuators.

FIG. 6 shows a similar system which allows the horizontal actuator 422 to enable horizontal torsion actuation. Hence, the actuators moved in an analogous way in concert, to simulate horizontal torsion.

Figure 8:
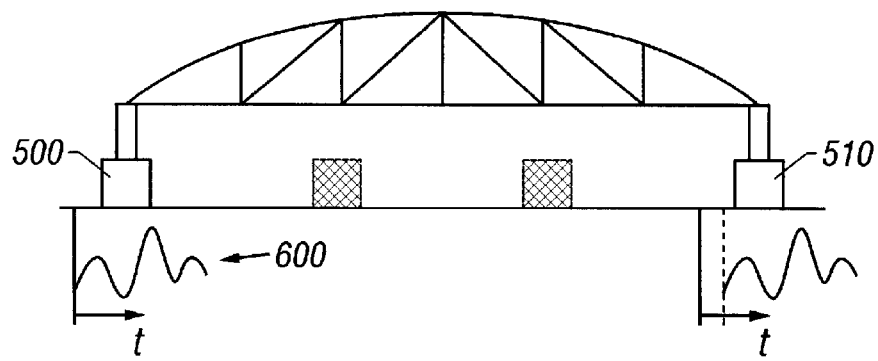
FIG. 8 shows an out of phase wave on actuators.

Various other features are also possible by appropriate control of the array of shaking units. FIG. 8 shows out-of-phase traveling waves being simulated by the shaking units. Each shaking unit is driven with specific traveling wave 600. The shaking unit 500 is advanced in phase relative to the shaking unit 510. This out-of-phase operation can be carried out using vertical or horizontal actuators.

Figure 7:
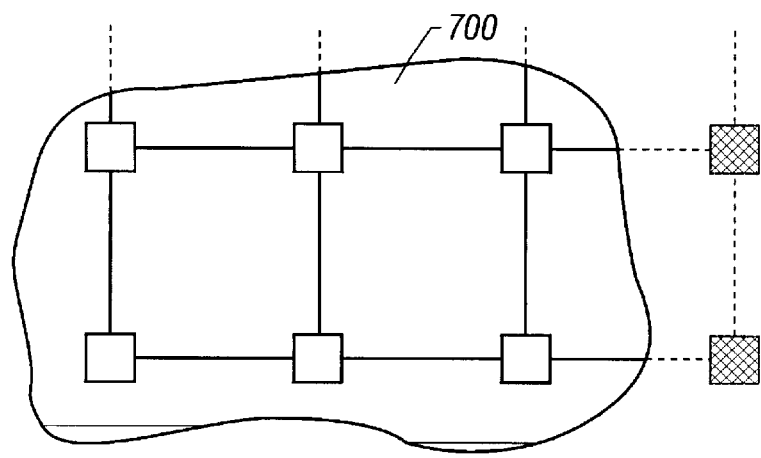
FIG. 7 shows a partial construction.

FIG. 7 shows how this system can be used for a partial construction system. In this system, the device to be tested 700 is placed on only some, but not all of the shaking tables. Only those shaking tables that are desired are then used.

A very long structure is tested by placing different bases or piers of the structure on separated shaking units. This allows different units to be used to simulate a device that is as long as desired. Again the velocity of a traveling earthquake wave could be used to simulate horizontal motion with an embedded phase difference. This is shown in FIG. 6.

Figure 9:
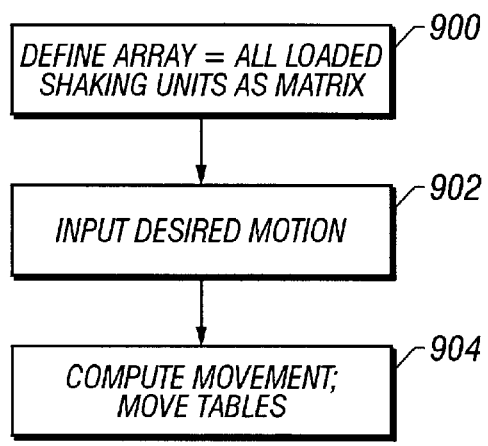
FIG. 9 shows a flowchart of operation of the system.

FIG. 9 shows a flowchart that portrays operation of the controller. Each of the shaking units is considered as one element of an array. The array is defined by a matrix in step 900. Each item in the matrix represents a position of the array element in one of the dimensions of movement.

At step 902, the desired motion is input. For example, this desired motion could be simple rocking, out of phase wave, torsion, or any of the other motions described above. The motion could be input as a mathematical relation between the x,y and z coordinates on each point, for example.

At step 904, the controller computes the movement for each element of the array, and changes the values in the matrix. The shaking tables are then appropriately moved.

Important advantages include the following.

Modularity. The full size projected shaking system need not be built to immediately. Partial units can be used and additional units can be brought in when necessary.

Economy. Each shaking unit is relatively small so that it only shakes a portion of the entire structure. In addition, each unit only needs to be able to provide less numbers of degrees of freedom, since the combination of the various units provides other degrees of freedom.

Although only a few embodiments have been disclosed above, other embodiments are within the disclosed embodiment. For example, any movement that can be simulated by moving in a arrayed pattern is possible using the techniques described herein.

What is claimed is:

1. An earthquake simulating system, comprising:
    a plurality of separated movement producing devices, each said movement producing device comprising a mounting surface connected to a plurality of actuators, said mounting surface being capable of movement in at least one direction in a way that can simulate movement during an earthquake; and
    a controller device adapted to control a plurality of said separated movement producing devices to move a plurality of said mounting surfaces in different directions to produce a desired earthquake-like movement.

2. A system as in claim 1, further comprising a plurality of position adjustment devices, each position adjustment device connected to one of said movement producing devices and adapted to allow a position of each of said movement producing devices to be adjusted.

3. A system as in claim 1, wherein each of said movement producing devices includes movement capabilities in three orthogonal dimensions.

4. A system as in claim 1, wherein said earthquake-like movement includes a rocking vertical motion.

5. A system as in claim 1, wherein said earthquake-like movement includes a horizontal torsion movement.

6. A system as in claim 1, wherein said movement producing devices include a moving element allowing movement of the device, and a locking element allowing locking the device.

7. A system as in claim 1, wherein said earthquake-like movement comprises a traveling wave which is out of phase at one movement producing device relative to another movement producing device.

8. An earthquake result simulating system, comprising:
    a plurality of separated movement producing devices, each said movement producing device being capable of movement in at least one direction in a way that can simulate movement during an earthquake; and
    a controller device, controlling said plurality of separated movement producing devices in synchronism relative to one another, to move in a way that simulates a dimension of movement other than said at least one direction, wherein said dimension of movement other than said at least one direction includes a traveling wave which is out of phase at one movement producing device relative to another movement producing device.

9. An earthquake simulating system, comprising:

a plurality of separated shake units, each shake unit comprising a mounting surface connected to a plurality of actuators and having at least first and second degrees of operation; and a controller adapted to separately control each of said shake units to simulate a third degree of operation.

10. A system as in claim 9, wherein said first and second degrees are movement of the mounting surface in two of the x, y, and z directions, and said third degree comprises movement in a non-x, non-y or non-z direction.

11. A system as in claim 10, wherein said third degree comprises a circular movement.

12. A system as in claim 10, wherein said third degree comprises a tilting movement.

13. A system as in claim 9, wherein said third degree of operation includes a traveling wave which is out of phase at one shake unit relative to another shake unit.

14. A method of simulating earthquakes, comprising:

providing a plurality of separated shake units, each shake unit including a mounting surface;

placing one of a plurality of parts of an object on the mounting surface of a corresponding one of said shake units; and moving at least one of said parts by a different amount than another of said parts to simulate earthquake effects on said object.

15. A method of simulating earthquakes, comprising:

providing a plurality of separated shake units;

placing a part of an object to be simulated on each of said shake units; and moving at least one of said parts by a different amount than another of said parts to simulate earthquake effects on said object, wherein said moving uses a similar waveform to each of said separated shake units, said waveform being out of phase at one of said shake units relative to another of said shake units.

\* \* \* \* \*